(12) United States Patent
Patel et al.

(10) Patent No.: US 7,023,168 B1
(45) Date of Patent: Apr. 4, 2006

(54) FIELD WEAKENING MOTOR CONTROL SYSTEM AND METHOD

(75) Inventors: Nitinkumar R. Patel, Cypress, CA (US); Steven E. Schulz, Torrance, CA (US); Seung Ki Sul, Seoul (KR); Bon-Ho Bae, Seoul (KR)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/939,553

(22) Filed: Sep. 13, 2004

(51) Int. Cl.
*H02P 3/18* (2006.01)
*H02P 5/04* (2006.01)
*H02P 5/28* (2006.01)

(52) U.S. Cl. .................. 318/757; 318/700; 318/701; 318/721; 318/722; 318/810

(58) Field of Classification Search .......... 318/138, 318/254, 700–811, 439, 430–434
See application file for complete search history.

(56) References Cited

U.S. PATENT DOCUMENTS

| | | | | |
|---|---|---|---|---|
| 4,649,331 A * | 3/1987 | Jahns | ................... | 318/798 |
| 4,677,360 A * | 6/1987 | Garces | ................... | 318/803 |
| 5,610,485 A * | 3/1997 | Depenbrock et al. | ..... | 318/432 |
| 6,163,128 A * | 12/2000 | Hiti et al. | ............... | 318/722 |
| 6,288,515 B1 * | 9/2001 | Hiti et al. | ............... | 318/722 |
| 6,504,329 B1 * | 1/2003 | Stancu et al. | ............. | 318/254 |
| 6,541,937 B1 * | 4/2003 | Kato | ..................... | 318/727 |
| 6,741,060 B1 * | 5/2004 | Krefta et al. | ............. | 318/727 |
| 6,763,622 B1 * | 7/2004 | Schulz et al. | ............ | 318/700 |
| 6,781,333 B1 * | 8/2004 | Koide et al. | ............. | 318/432 |
| 6,894,454 B1 * | 5/2005 | Patel et al. | .............. | 318/700 |
| 6,924,617 B1 * | 8/2005 | Schulz et al. | ............ | 318/701 |
| 6,936,991 B1 * | 8/2005 | Chen et al. | .............. | 318/700 |

FOREIGN PATENT DOCUMENTS

| JP | 08-336292 | * 12/1998 |
|---|---|---|
| JP | 08-336300 | * 12/1998 |

* cited by examiner

*Primary Examiner*—David Martin
*Assistant Examiner*—Tyrone Smith
(74) *Attorney, Agent, or Firm*—Christopher DeVries

(57) ABSTRACT

A control system for an electric machine includes a flux weakening module, which includes a voltage magnitude calculator that receives d-axis and q-axis command voltages and that generates a voltage magnitude. An error circuit compares the voltage magnitude to a reference voltage and generates an error signal. A controller receives the error signal and generates a feedback flux correction signal. A limiter limits the feedback flux correction signal to a predetermined flux value and generates a limited feedback flux correction signal. A feedforward stator flux generating circuit generates a feedforward stator flux signal. A summing circuit sums the feedforward stator flux signal and the limited feedback flux correction signal to generate a final stator flux command.

16 Claims, 8 Drawing Sheets

FIELD WEAKENING MOTOR CONTROL SYSTEM AND METHOD

FIELD OF THE INVENTION

The present invention relates to the control of permanent magnet (PM) motors in both the constant torque and flux weakening regions, and more particularly to adjusting magnetic flux to improve the performance of PM motors beyond a base speed.

BACKGROUND OF THE INVENTION

A vector controlled PWM voltage source inverter may be used to excite a PM motor, such as an interior permanent magnet (IPM) motor. Using this approach provides accurate torque control, improved dynamic response, and increased motor efficiency. Reducing the magnetic flux inside the motor, which is also called flux or field weakening, may provide improved power characteristics of the PM motor at higher speeds. Flux weakening in a PM motor can be accomplished by adjusting the stator excitation.

During a constant torque region, closed loop current regulators control the applied PWM voltage excitation so that the instantaneous phase currents follow their commanded values. However, saturation of the current regulators may occur at higher speeds when the motor terminal voltage approaches a maximum voltage of the PWM inverter. Beyond this point, the flux should be weakened to maintain proper current regulation up to maximum motor speed.

Conventional field weakening approaches rely on voltage control loops or current angle control loops. Inherently, the voltage control loop approach has poor dynamic performance. Additionally, for IPM machines with reluctance and magnet flux, using the voltage control loop for field weakening does not guarantee optimum torque per ampere in the field-weakening region.

The current angle control loop approach does not work with high back EMF PM machines since it cannot inject any field weakening current when torque is not applied at higher speeds. In addition, for a given constant torque command, the current angle control loop approach will not maintain constant developed torque (i.e. torque linearity) as the drive enters into field weakening and approaches maximum speed.

SUMMARY OF THE INVENTION

A flux weakening module for a permanent magnet electric machine includes a feedforward stator flux term and a compensating feedback flux correction term. The feedforward stator flux term provides the dominant field weakening flux value. The feedback flux correction term improves stability under dynamic conditions and compensates for parameter variations in steady-state. These two flux terms are added and limited to provide the final stator flux command.

A control system for a permanent magnet (PM) electric machine with a rotor includes a voltage command module that receives a desired torque command, a DC link voltage, an angular velocity of a rotor of the PM electric machine, a final stator flux command, and an angular position of the rotor. The voltage command module generates d-axis and q-axis command voltages. The command module vector rotates the d-axis and q-axis command voltages using the angular position of the rotor to generate first and second stationary voltage commands. A pulse width modulated (PWM) inverter receives the first and second stationary voltage commands and generates phase voltage signals for the PM electric machine. A field weakening module generates the final stator flux command using the feedforward stator flux command and the feedback flux correction command.

In other features, the voltage command module includes a torque limiter that limits the desired torque command between upper and lower limits and that generates a modified desired torque command. A d-axis current module generates a d-axis current command signal based on the calculated final stator flux command and the modified desired torque command. A q-axis current module generates a q-axis current command signal based on the calculated final stator flux command and the modified desired torque command.

In other features, a synchronous current regulator receives the d-axis and q-axis current command signals and generates the d-axis and q-axis voltage command signals. The voltage command module includes a synchronous to stationary module that receives the d-axis and q-axis command voltages and the rotor position and generates the first and second stationary voltage commands.

In still other features, a rotor position transducer measures the rotor position and generates a rotor position signal. Alternately, a rotor position estimator estimates the rotor position and generates a rotor position signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
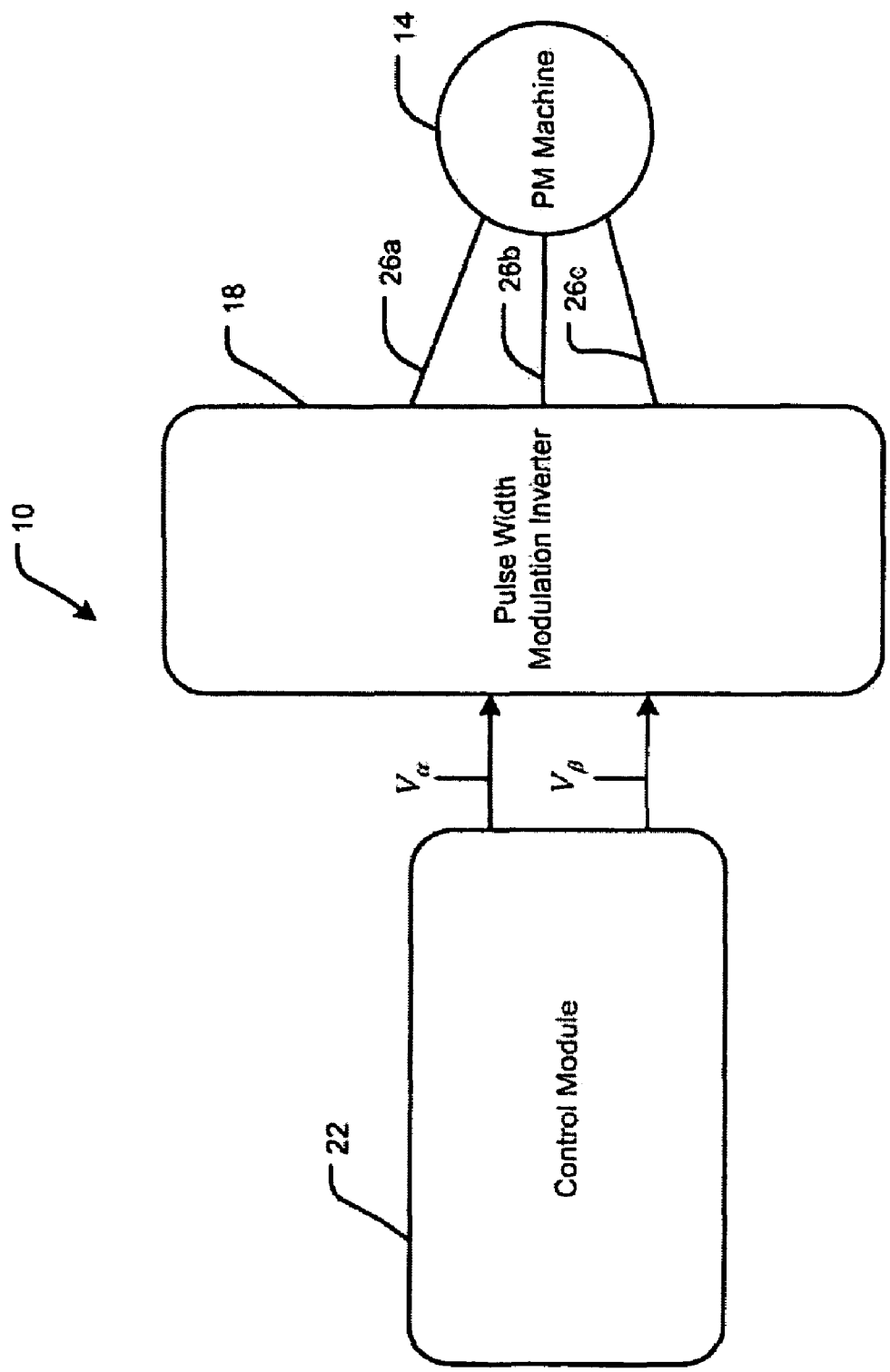
FIG. 1A is a functional block diagram of a motor control system for a permanent magnet motor according to the present invention.

The following description of the preferred embodiment(s) is merely exemplary in nature and is in no way intended to limit the invention, its application, or uses. As used herein, the term module refers to an application specific integrated circuit (ASIC), a controller, an electronic circuit, a processor (shared, dedicated, or group) and memory that execute one or more software or firmware programs, a combinational logic circuit, or other suitable components that provide the described functionality.

The voltage equation for the IPM in the synchronous rotating reference frame can be represented in matrix form as follows:

$$\begin{bmatrix} V_{ds}^e \\ V_{qs}^e \end{bmatrix} = \begin{bmatrix} R_s & -\omega_e L_{qs} \\ \omega_e L_{ds} & R_s \end{bmatrix} \begin{bmatrix} i_{ds}^e \\ i_{qs}^e \end{bmatrix} + \begin{bmatrix} 0 \\ \omega_e \phi_f \end{bmatrix} \quad (1)$$

$V_{ds}^e$ and $V_{qs}^e$ are d-axis and q-axis motor terminal voltages in the synchronous reference frame. $i_{ds}^e$ and $i_{qs}^e$ are d-axis and q-axis motor terminal currents in the synchronous reference frame. $L_{ds}$ and $L_{qs}$ are d-axis and q-axis stator self-inductances. $R_s$ is stator resistance. $\phi_f$ is the permanent magnet flux linkage. $\omega_e$ is the electrical angular velocity.

The developed torque equation of the IPM is expressed as follows.

$$T_e = \frac{3P}{4}[\phi_f i_{qs}^e + (L_{ds} - L_{qs})i_{qs}^e i_{ds}^e] \quad (2)$$

Where P is the number of poles. DC link voltage and PWM strategies limit the maximum voltage $V_{smax}$. The inverter current rating and the machine thermal rating determine the maximum current $I_{smax}$. Therefore the voltage and the current of the motor have following limits:

$$V_{ds}^{e2} + V_{qs}^{e2} \leq V_{s\,max}^2 \quad (3)$$

$$i_{ds}^{e2} + i_{qs}^{e2} \leq I_{s\,max}^2 \quad (4)$$

The field-weakening algorithm according to the present invention operates within the limits outlined in equations (3) and (4). While the present description relates to IPM machines, skilled artisans will appreciate that the field-weakening approach according to the present invention is applicable to interior permanent (or buried magnet) machines, surface mount magnet machines, synchronous reluctance type machines and other similar machines.

The torque equation (2) represents a constant torque curve on the d-q current plane according to the given torque. On the constant torque line, the flux magnitude as a function of the d-axis current can be presented as follows;

$$|\lambda_{dqn}|^2 = (\rho L_{dn} i_{qn})^2 + (\phi_{fn} + L_{dn} i_{dn})^2 \quad (5)$$

$$= \frac{\rho^2 L_{dn}^2 T_e^2}{\{\phi_{fn} - (\rho - 1)L_{dn} i_{dn}\}^2} + (\phi_{fn} + L_{dn} i_{dn})^2$$

where the subscript 'n' denotes the normalized value and $\rho$ is the saliency ratio, $L_{qn}/L_{dn}$.

The flux magnitude in equation (5) increases with respect to the d-axis current magnitude due to the second term. In addition, it increases towards infinity when the d-axis current converges to the asymptote, $I_{dn} = \phi_{fn}/(\rho-1)L_{dn}$, since the denominator of the first term converges to zero. The operating point with the minimum flux magnitude on the constant torque curve is derived from the differentiation of equation (5) as follows, $$\frac{d}{d i_{dn}}|\lambda_{dqn}|^2 = \frac{2\rho^2 L_{dn}^3 T_e^2 (\rho-1)}{\{\phi_{fn} - (\rho-1)L_{dn} i_{dn}\}^3} + 2L_{dn}(\phi_{fn} + L_{dn} i_{dn}) = 0 \quad (6)$$

The flux magnitude is constant for any operating point that satisfies (6), and the variation of the voltage magnitude is zero with a fixed motor speed. The operating points with a constant output voltage are presented by ellipses with respect to the speed, and the variation of the flux magnitude is zero on the ellipses.

Figure 7:
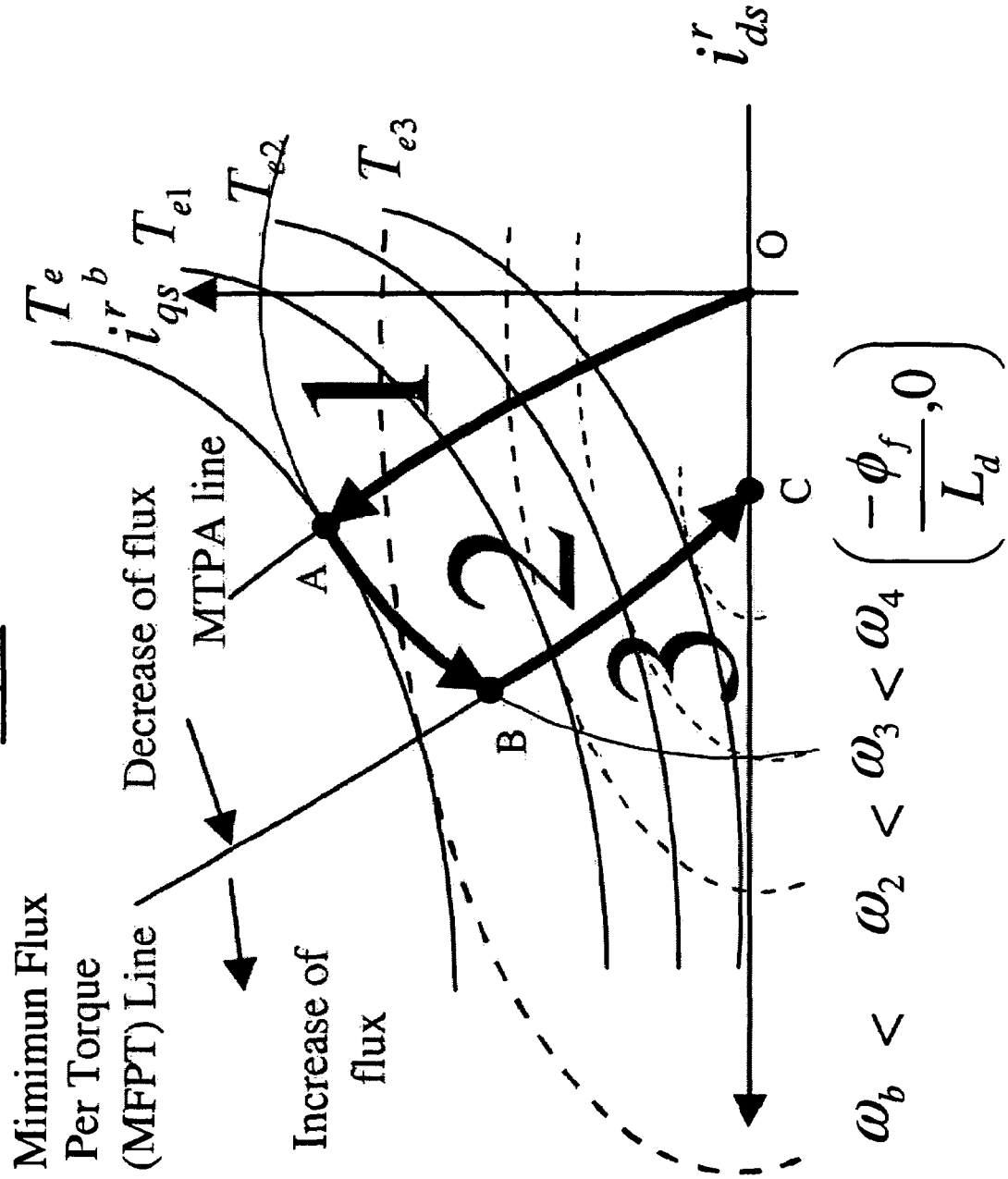
FIG. 7 is a graph illustrating operating regions in the field weakening control system according to the present invention.

FIG. 7 shows the voltage and current limits from Equations 3 and 4 plotted on the DQ current plane. The voltage limit ellipse has constant voltage magnitude and constant flux level for a given speed. Thus the minimum flux magnitude operating points on the constant torque curve occur at the intersection points of the constant torque curves and constant voltage ellipses. The points with the minimum flux magnitude can be presented by a line, which is named as the MFPT (Minimum Flux Per Torque) line. On the constant torque curves, the flux magnitude decreases as the operating points approach the MFPT line and vice versa.

FIG. 7 shows the three operation regions divided by the MTPA (Maximum Torque Per Ampere Line) line, the current limit line (i.e. AB), and the MFPT line. The field weakening operation in the three regions can be summarized as follows: In region 1, the operating points in this area (to the right of line O-A) require more current than those on the MTPA line for the given torque command. In addition, the operating points in this area require more flux magnitude and output voltage than those on the MTPA line. For this reason, the field weakening operation selects the operating points on the MTPA line as a function of the torque command instead of those in this area.

In region 2, the operating points in this area (between lines O-A and B-C) require more current than those on the MTPA line for the given toque command, but they require smaller flux magnitude and output voltage since they are approaching the MFPT line. In the field weakening control, when field weakening is required, the d and q-axis current references are adjusted from the MTPA line toward the MFPT line in this region.

In region 3, since the operating points in this area (to the left of line B-C) require more output current and voltage magnitude than those in the region 2, the proposed algorithm does not use this area.

Under normal operation, the current trajectory follows the MTPA line as the torque command is increased. If field weakening is required due to increasing motor speed or decreasing dc link voltage, the d and q-axis current references are adjusted from the MTPA line toward the MFPT line along the constant torque lines. By moving on the constant torque curve, the motor torque can be controlled according to the torque command even in the field weakening region and hence maintains proper torque linearity. As the operating point moves to the left along the constant torque line, the torque per ampere will decrease. When the operating points reach the MFPT line by the field weakening operation, further flux reduction is not possible while maintaining constant torque. Instead, the proposed control adjusts the operating point towards point C along the MFPT line to weaken the flux magnitude and the output torque is reduced.

Referring now to FIG. 1, a motor control system 10 for a permanent magnet (PM) machine 14 is shown. The motor control system 10 provides improved dynamic performance and torque linearity for the PM machine 14 during high speed operation. The motor control system 10 includes a pulse width modulation (PWM) voltage source inverter 18 that supplies three phase excitation to the stator of the PM machine 14. A control module 22 communicates with and controls the PWM inverter 18. The PWM inverter 18 outputs phase voltage signals 26a, 26b and 26c that are used to control the operation of the PM machine 14.

The control module 22 receives a desired torque command that indicates a desired output torque level. The control module 22 utilizes a DC link voltage input, a rotor angular velocity input and the desired torque command to generate first and second stationary voltage commands $V_\alpha$ and $V_\beta$. The first and second stationary voltage commands $V_\alpha$ and $V_\beta$ are input to the PWM inverter 18.

Based on the first and second stationary voltage commands $V_\alpha$ and $V_\beta$, the PWM inverter outputs the three phase voltage signals 26a, 26b and 26c. The voltage signals 26a, 26b and 26c control the operation of the PM machine 14. More specifically, the control module 22 generates the first and second stationary voltage commands $V_\alpha$ and $V_\beta$ such that the voltage signals 26a, 26b and 26c reduce stator flux of the PM machine 14 and increase rotor speed while maintaining a voltage generated by the motor approximately at or below a maximum voltage output of the PWM inverter 18.

Figure 1B:
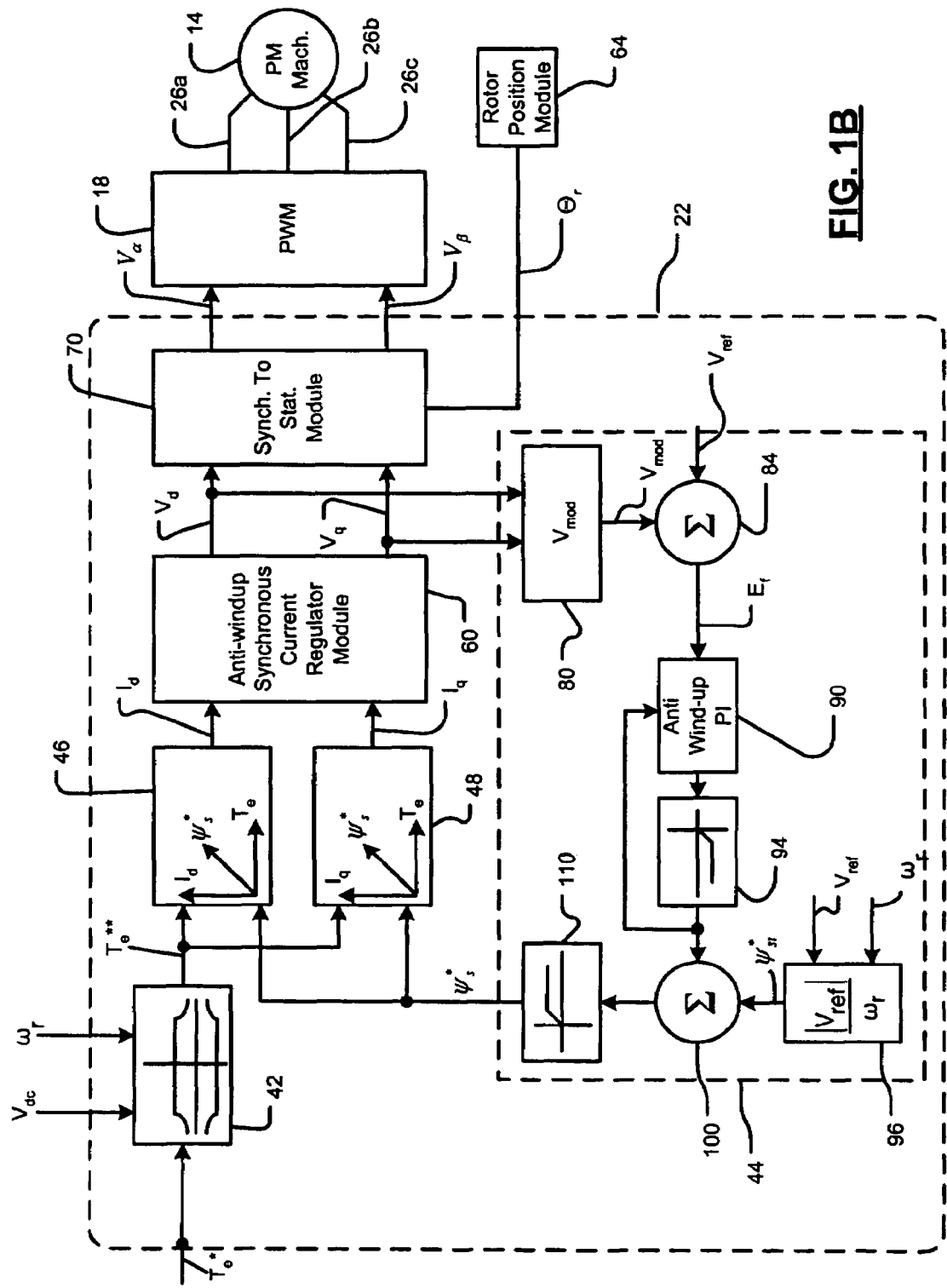
FIG. 1B is a functional block diagram of the motor control system of FIG. 1 in further detail.

Referring now to FIG. 1B, the input to the control system is a torque command ($T_e^*$). The torque command $T_e^*$ is input to a torque limiter 42, which limits the torque command between upper and lower torque limits. The limits are based on DC link voltage $V_{dc}$ (which is the battery voltage or other DC voltage source of the inverter) and rotor angular velocity $\omega_r$. The limiter 42 generates a modified torque command ($T_e^{}$). The modified torque command ($T_e^{}$) and calculated stator flux command ($\psi^*_s$) (generated using a field-weakening module 44 described further below) are used as indices to d-axis and q-axis look-up tables 46 and 48, respectively.

The d-axis and q-axis look-up tables 46 and 48 generate d-axis and q-axis stator current commands ($I_d^*$ and $I_q^*$), respectively. These current commands are then fed to the anti-windup synchronous current regulator module 60 to generate command voltages $V_d^*$ and $V_q^*$. Command voltages $V_d^*$ and $V_q^*$ are vector rotated, using rotor angular position ($\theta_r$) generated by a rotor position sensor and/or estimated using sensorless techniques (identified as rotor position module 64), using synchronous to stationary transformation module 70. Stationary output voltages $V_\alpha^*$ and $V_\beta^*$ are fed to the PWM inverter 18, which applies alternating three phase voltages to the stator windings of the PM machine 14.

Synchronous reference frame voltage commands $V_d^*$ and $V_q^*$ are supplied to a voltage magnitude ($V_{mod}$) calculator 80, which generates an output $V_{mod}$ that is compared to reference voltage ($V_{ref}$) to generate an error signal $E_f$ if further field weakening is required. The magnitude calculator 80 computes the stator voltage magnitude from the two orthogonal DQ voltage components as shown in Equation 7:

$$V_{mod} = \sqrt{(V_{ds}^e)^2 + (V_{qs}^e)^2} \qquad (7)$$

The error signal $E_f$ that is generated by summation module 84 is fed to anti wind-up proportional integral (PI) type controller 90.

The output of the anti wind-up PI controller 90 is processed by a limiter 94 to ensure safe reduction of the field. In other words, the limiter 94 limits field weakening to a predetermined value. A divider 96 is used to calculate feedforward stator flux ($\psi^*_{sf}$) using reference voltage ($V_{ref}$) and angular velocity ($\omega_r$). The output of limiter 94 is added to the output the divider via summer 100 to generate a final stator flux command. Under normal operation, the feedforward stator flux calculated by divider 96 provides the desired field weakening to retain current control. However, when the feedforward stator flux command calculated using the divider 96 is not providing enough field weakening, then elements 80, 84, 90, and 94 are automatically activated to stabilize the flux weakening operation. The output of the summer 100 is input into a limiter 110, which limits the maximum flux at low speed, and guarantees constant flux in the constant torque region.

Figure 2:
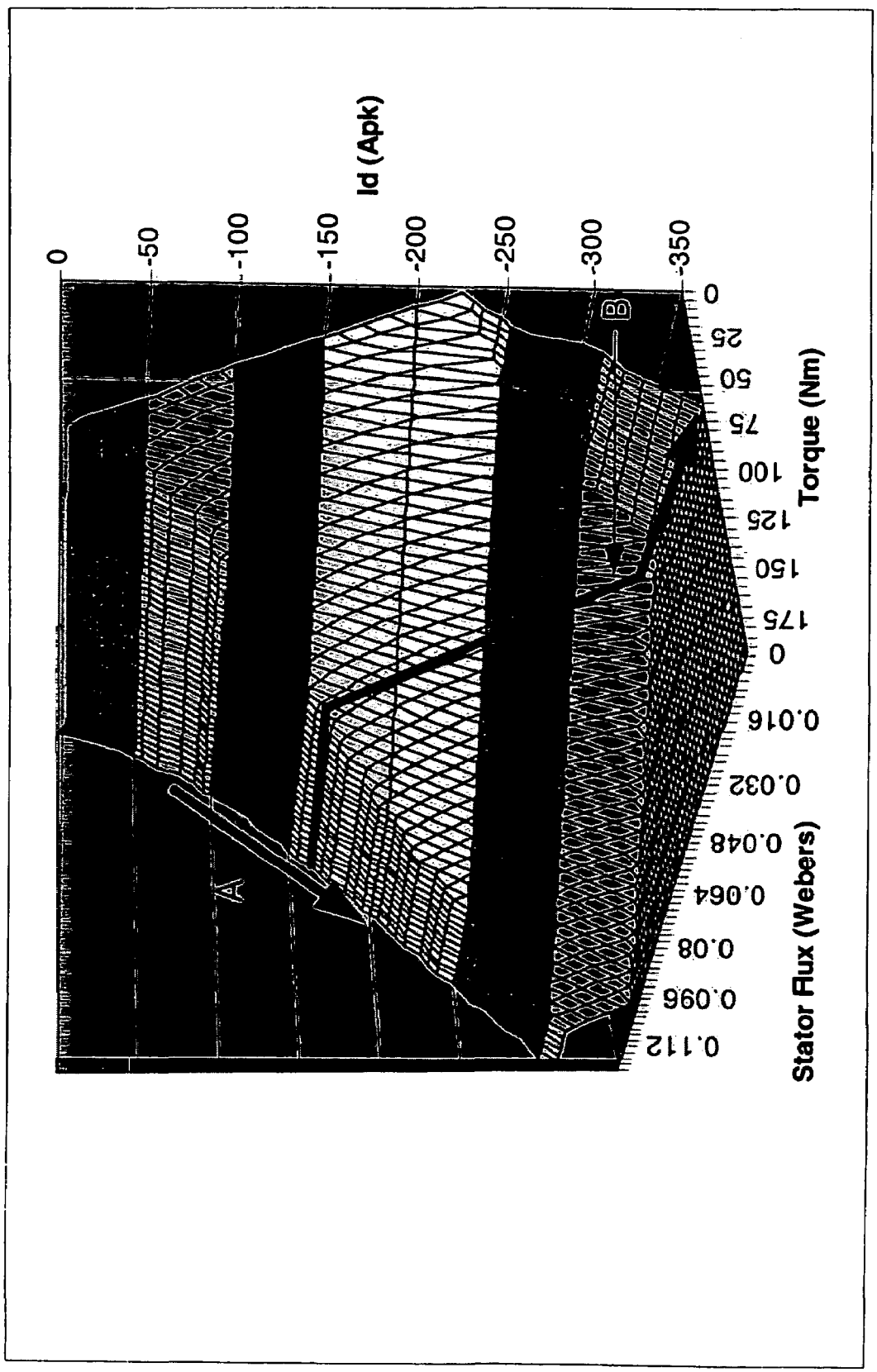
FIG. 2 illustrates an exemplary look-up table relating direct axis (d-axis) current ($I_d$), desired torque and calculated final stator flux command.
Figure 3:
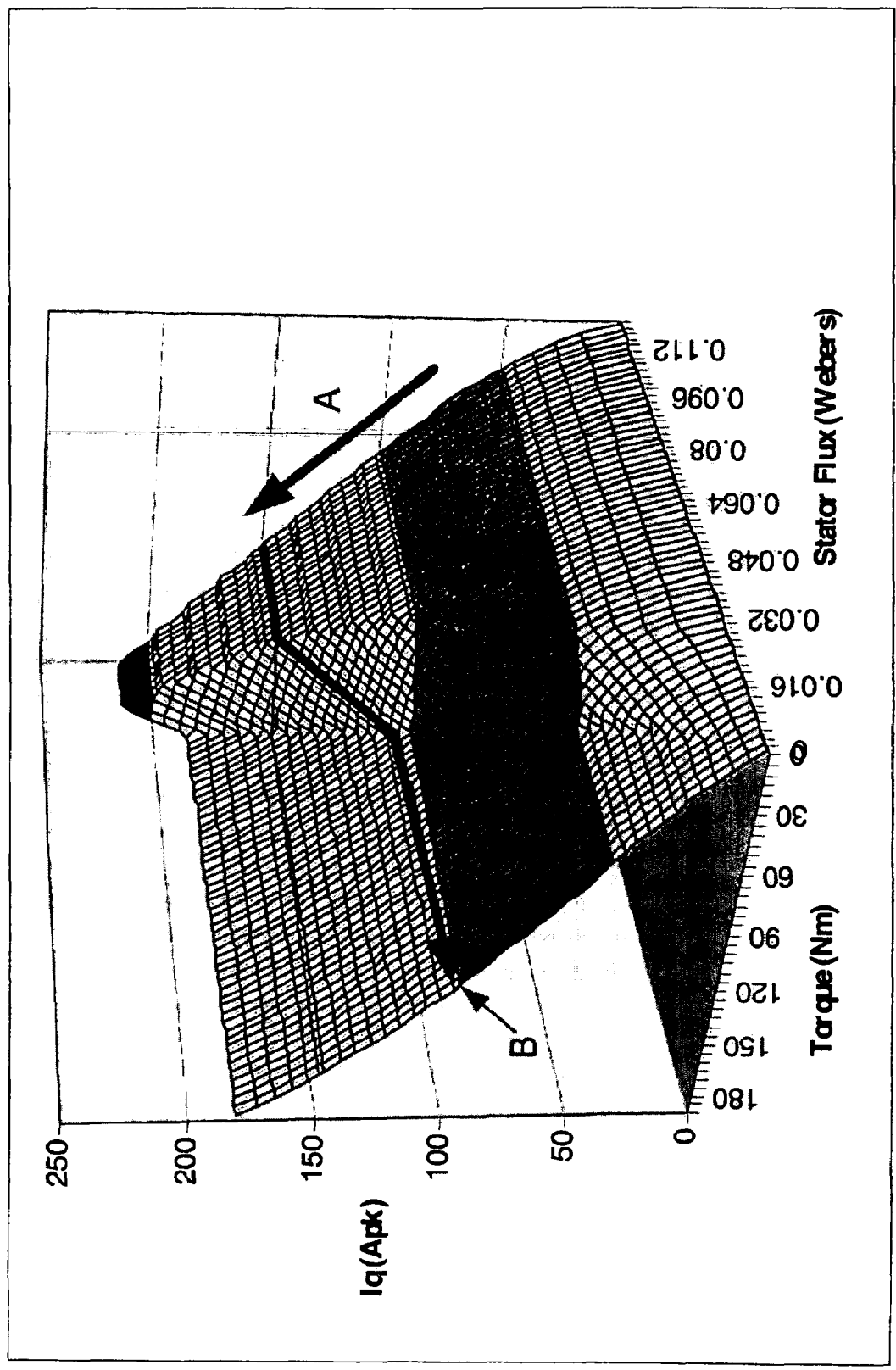
FIG. 3 illustrates an exemplary look-up table relating quadrature axis (q-axis) current ($I_q$), desired torque and calculated final stator flux command.

Self-inductances $L_{ds}$ and $L_{qs}$ are first obtained through machine characterization using equations (1 and 2) set forth above. From the obtained inductances, d-axis and q-axis current look-up tables 46 and 48, in FIG. 1B, are derived using data processing as a function of modified torque command Te** and final stator flux command $\psi^*_s$. FIGS. 2 and 3 show an exemplary relationship between d-axis and q-axis currents, torque and stator flux for one implementation.

The d-axis and q-axis look-up tables that are shown in FIGS. 2 and 3 provide appropriate d-axis and q-axis command currents for any given speed, desired torque and DC link bus voltage. In other words these tables work well in both constant torque as well constant power regions. While in the constant torque region (i.e. below base speed), the d-axis and q-axis current commands increase according to a trajectory "A" that is shown in FIGS. 2 and 3 as the torque command increases. In the constant power region (field-weakening region or above base speed), the q-axis current command decreases and the d-axis current command increases according to a trajectory "B" that is shown in FIGS. 2 and 3 for a given constant torque command. Since similar look-up tables are utilized for constant torque and constant power regions, entry and exit between the two regions is transparent under loaded and unloaded conditions.

The field weakening approach described according to the present invention was implemented and tested using a 70 kW IPM machine. Experiment results obtained using field weakening approach are shown in FIGS. 4, 5 and 6.

Figure 4:
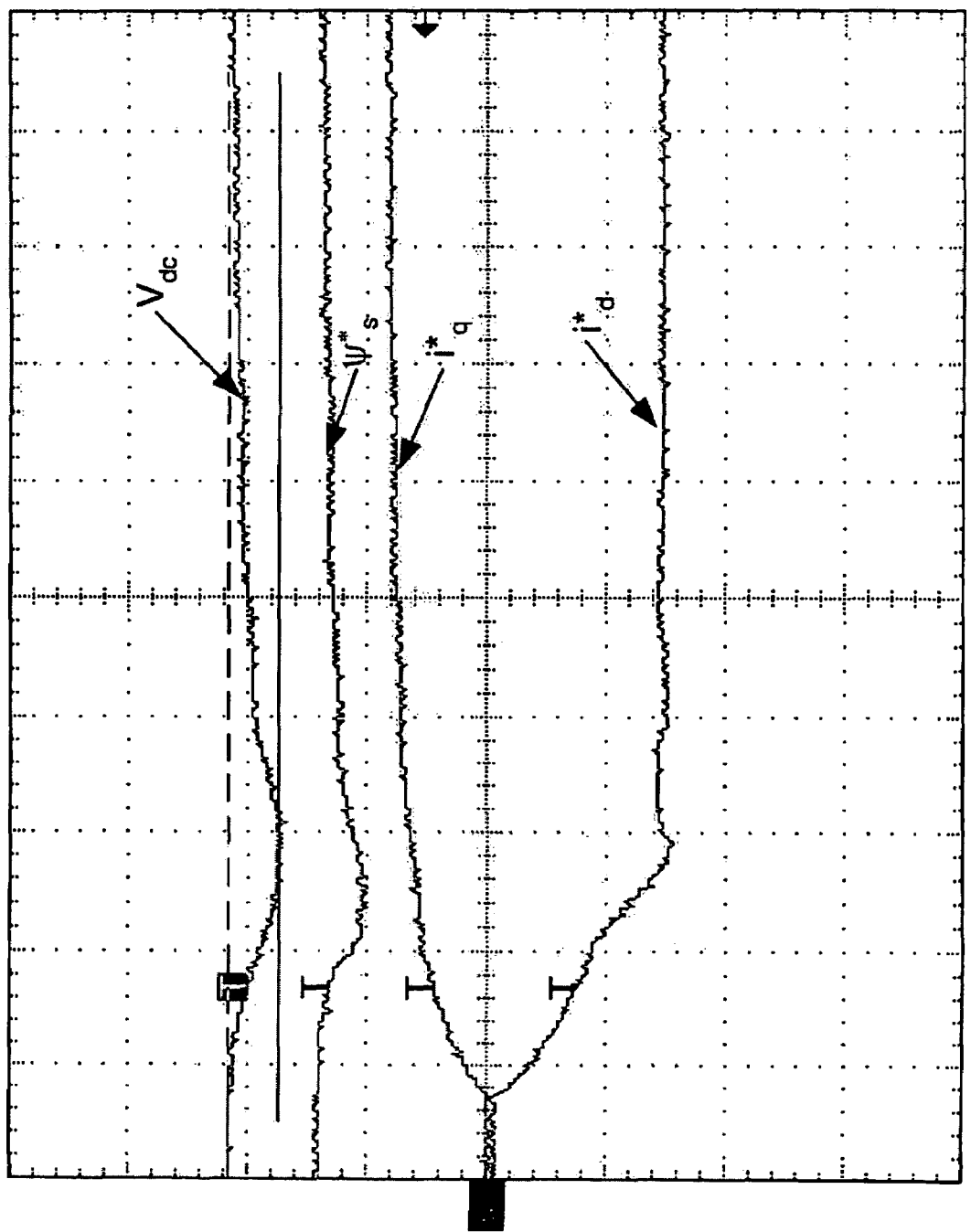
FIG. 4 is a graph showing field weakening performance during torque transient at constant motor speed for an exemplary implementation.

Referring now to FIG. 4, the improved dynamic response of the field-weakening approach according to the present invention is shown. During this test the mechanical speed of the unit under test was held constant and 0 to 100% torque transient was applied to the drive. As shown in FIG. 4, the DC link bus sagged about 20% following the torque transient. The sagging affected the transient response in the d-axis and q-axis current commands. However, the optimum current commands were established within about 100 msec.

Figure 5:
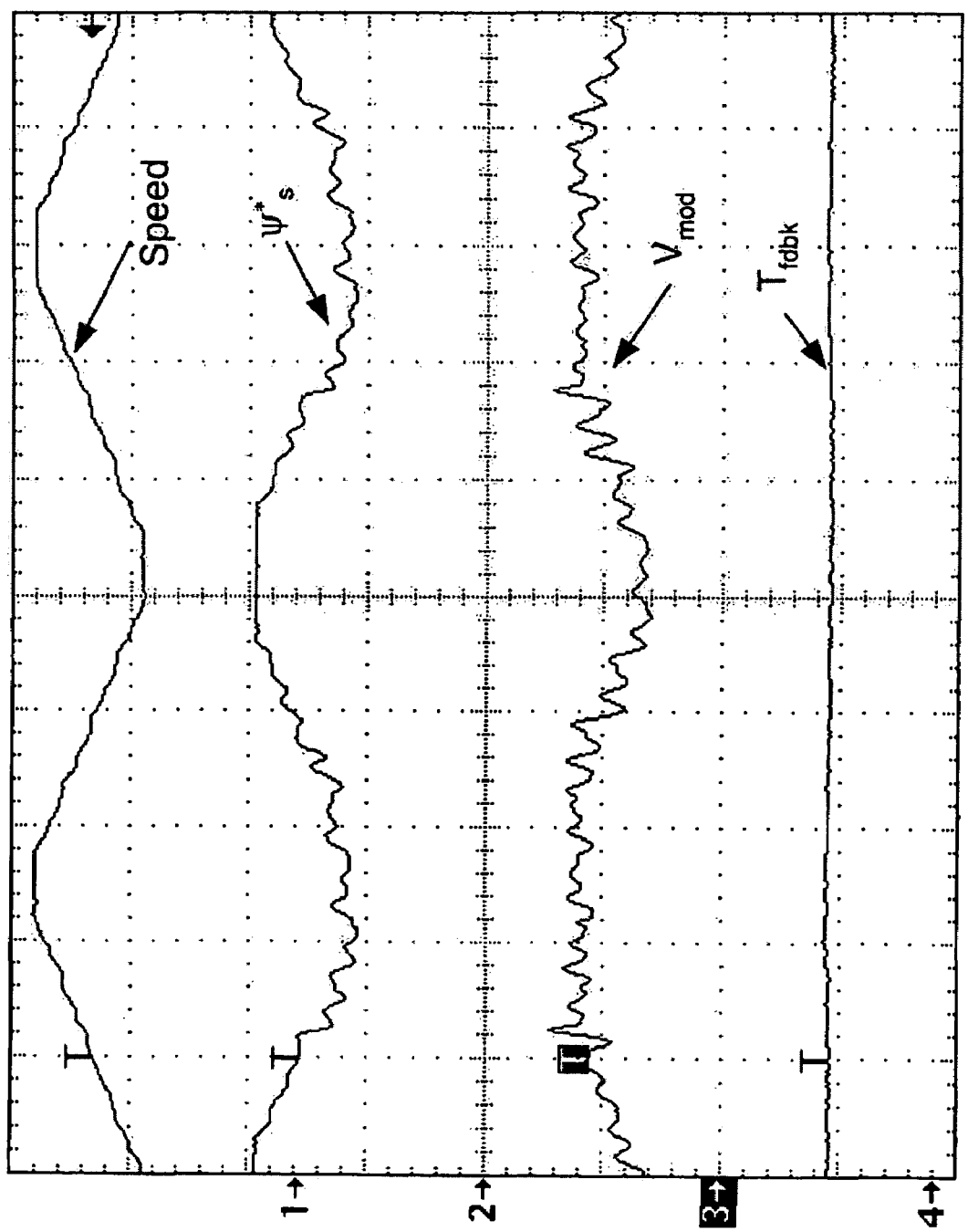
FIG. 5 is a graph showing field weakening performance during speed transients at 50% constant command torque for an exemplary implementation.

Referring now to FIG. 5, the field weakening approach is shown for motor speeds between 3000 rpm and 5000 rpm with load torque applied. As shown in FIG. 5, as the drive accelerated, the output of the regulator voltage $V_{mod}$ started increasing. $V_{mod}$ increased up to about 3700 rpm and then remained constant. At the same time, the stator flux was continually reducing as speed approached 5000 rpm. Providing the field weakening regulate $d_r$ the inverter output voltage to the predefined reference level $V_{ref}$. The exit from the field weakening can be observed as the drive started decelerating from 5000 rpm to 3000 rpm. Also as can be seen from FIG. 5, the developed torque $T_{fdbk}$ during both constant torque and constant power regions is constant, which provides proving good torque linearity as long as the commanded torque is less than or equal to the designed torque limit of the machine. If 100% of the rated torque is commanded as the drive accelerated from 0 to maximum speed, the available maximum torque in the constant power region is reduced to protect the machine from overheating and mechanical failure.

Figure 6:
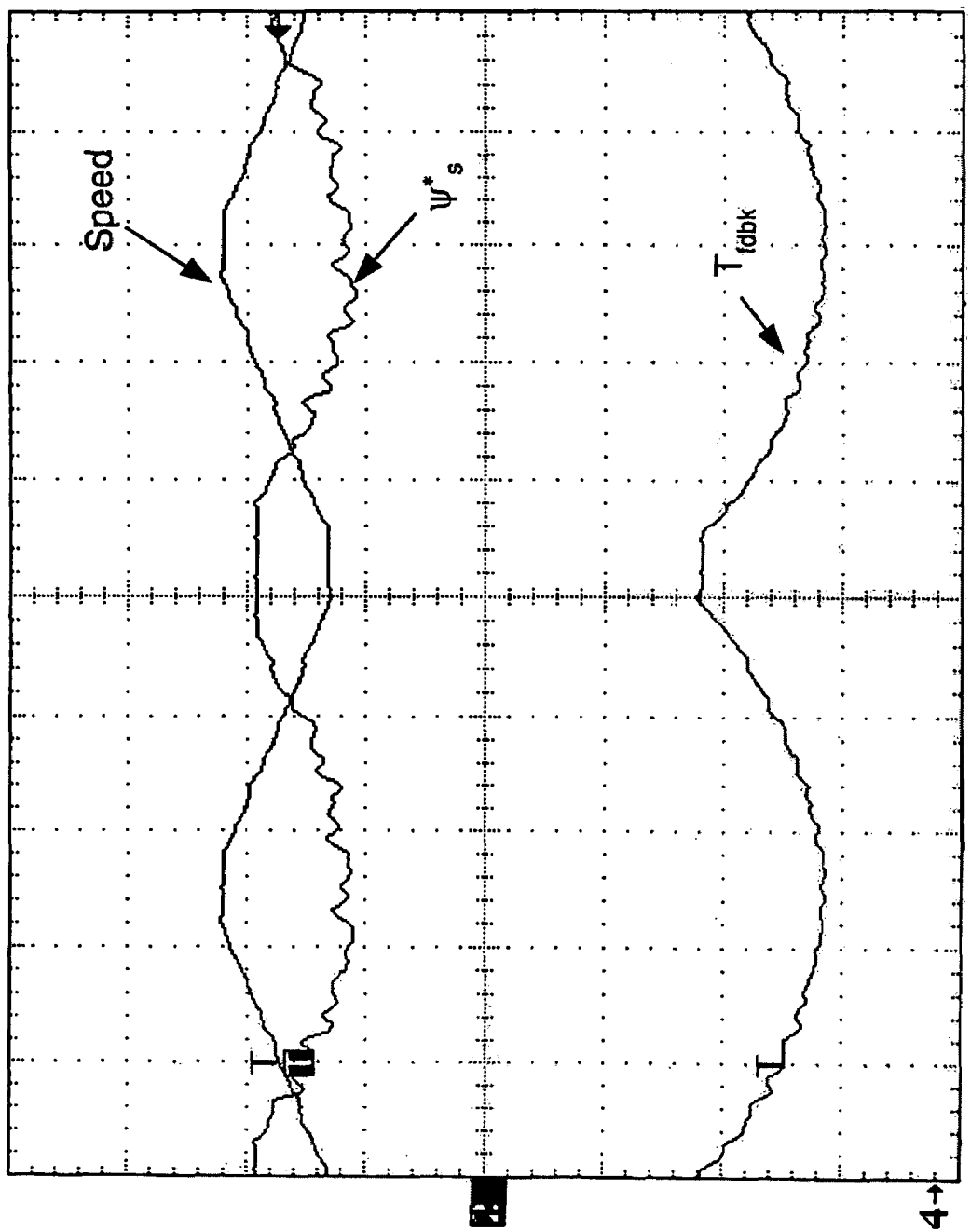
FIG. 6 is a graph showing field weakening performance during speed transients at 100% constant command torque for an exemplary implementation.

Referring now to FIG. 6, field-weakening performance during speed transients between 3000 and 5000 rpm under a fully loaded condition are shown. Reduction in the developed torque can be observed as the drive entered into a constant power region. Therefore, FIGS. 4, 5 and 6 successfully demonstrate the benefits of the field-weakening approach according to the present invention under fast dynamic conditions.

The field weakening approach according to the present invention provides improved dynamic response in the field weakening range and maintains torque linearity while field weakening. The field weakening approach is insensitive to variations in DC link voltage and operates in both low and high back EMF type machines.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A flux weakening module for a permanent magnet electric machine, comprising:
    a voltage magnitude calculator that receives d-axis and q-axis command voltages and that generates a stator voltage magnitude;
    an error circuit that compares said voltage magnitude to a reference voltage and generates an error signal;
    a controller that receives said error signal and that generates a feedback flux correction signal;
    a limiter that limits said feedback flux correction signal to a predetermined flux value and that generates a limited feedback flux correction signal;
    a feedforward stator flux generating circuit that generates a feedforward stator flux; and
    a summing circuit that sums said feedforward stator flux and said limited feedback flux correction signal to generate a calculated final stator flux command.

2. The flux weakening module of claim 1 further comprising a limiter that limits said calculated final stator flux command.

3. The flux weakening module of claim 1 wherein said controller is an anti wind-up proportional integral controller.

4. The flux weakening module of claim 1 wherein said feedforward stator flux generating circuit generates said feedforward stator flux command based on said reference voltage and an angular velocity of a rotor of said PM electric machine.

5. A control system for a permanent magnet (PM) electric machine including a rotor, comprising:
    a voltage command module that receives a desired torque command, a DC link voltage, an angular velocity of a rotor of said PM electric machine, a calculated final stator flux, and a rotor position, that generates d-axis and q-axis command voltages, and that vector rotates said d-axis and q-axis command voltages using said angular position of the rotor to generate first and second stationary voltage commands;
    a field weakening module that receives said d-axis and q-axis command voltages and that generates a feedback stator flux correction; and
    a pulse width modulated (PWM) inverter that receives said first and second stationary voltage commands and that generates phase voltage signals for said PM electric machine.

6. The control system of claim 5 wherein said voltage command module includes a torque limiter that limits said desired torque command between upper and lower limits and that generates a modified desired torque command.

7. The control system of claim 6 wherein said voltage command module includes:
    a d-axis current module that generates a d-axis current command signal based on said calculated final stator flux and said modified desired torque command; and
    a q-axis current module that generates a q-axis current command signal based on said calculated final stator flux and said modified desired torque command.

8. The control system of claim 7 wherein at least one of said d-axis current module and said q-axis current module is a lookup table.

9. The control system of claim 7 wherein said voltage command module further includes:
    a synchronous current regulator that receives said d-axis and q-axis current command signals and that generates said d-axis and q-axis voltage command signals.

10. The control system of claim 9 wherein said voltage command module includes a synchronous to stationary module that receives said d-axis and q-axis command voltages and said rotor position and that generates said first and second stationary voltage commands.

11. The control system of claim 5 further comprising a rotor position transducer that measures said rotor position and that generates a rotor position signal.

12. The control system of claim 5 further comprising a rotor position estimator that estimates said rotor position and that generates a rotor position signal.

13. The control system of claim 5 wherein said flux weakening module includes:
    a voltage magnitude calculator that receives said d-axis and q-axis command voltages and that generates a voltage magnitude;
    an error circuit that compares said voltage magnitude to a reference voltage and generates an error signal;
    a controller that receives said error signal and that generates a feedback flux correction signal;
    a limiter that limits said feedback flux correction signal to a predetermined flux value and that generates a limited feedback flux correction signal;
    a feedforward stator flux generating circuit that generates a feedforward stator flux signal;

a summing circuit that sums said required feedforward stator flux and said limited feedback flux correction signal to generate a final stator flux command.

14. The control system of claim 13 further comprising a limiter that limits said final stator flux command.

15. The control system of claim 14 wherein said controller is an anti wind-up proportional integral controller.

16. The flux weakening module of claim 14 wherein said feedforward stator flux generating circuit generates said feedforward stator flux command based on said reference voltage and an angular velocity of a rotor of said PM electric machine.

* * * * *